United States Patent
Kwon

(10) Patent No.: US 7,761,213 B2
(45) Date of Patent: Jul. 20, 2010

(54) METHOD FOR CONTROLLING ENGINE TORQUE OF AUTOMATIC TRANSMISSION FOR VEHICLES AND SYSTEM THEREOF

(75) Inventor: Hyuk Bin Kwon, Gunpo (KR)

(73) Assignee: Hyundai Motor Company, Seoul (KR)

( * ) Notice: Subject to any disclaimer, the term of this patent is extended or adjusted under 35 U.S.C. 154(b) by 910 days.

(21) Appl. No.: 11/603,874

(22) Filed: Nov. 22, 2006

(65) Prior Publication Data

US 2008/0033618 A1 Feb. 7, 2008

(30) Foreign Application Priority Data

Aug. 2, 2006 (KR) .................. 10-2006-0073008

(51) Int. Cl.
*B60K 6/543* (2007.10)
(52) U.S. Cl. .......................... 701/54; 60/329
(58) Field of Classification Search ................ 701/54; 60/329, 375, 428, 431, 486; 47/34, 80, 72, 47/3, 156–158

See application file for complete search history.

(56) References Cited

U.S. PATENT DOCUMENTS

| 5,807,206 | A * | 9/1998 | Okazaki ................ 477/98 |
| 6,208,498 | B1 * | 3/2001 | Ueda .................... 361/160 |
| 7,223,205 | B2 * | 5/2007 | Etchason et al. ....... 477/98 |
| 7,311,634 | B2 | 12/2007 | Shim |

* cited by examiner

*Primary Examiner*—Dalena Tran
(74) *Attorney, Agent, or Firm*—Morgan, Lewis & Bockius LLP

(57) ABSTRACT

A method and system of controlling an engine torque of an automatic transmission calculate a current oil temperature in a torque converter and restrict an engine torque based on the calculated current oil temperature if the torque converter is determined to be in a stall state. The method may include detecting vehicle information; determining whether a stall condition is satisfied; calculating, if the stall condition is satisfied, a current oil temperature in a torque converter; comparing the current oil temperature to a predetermined temperature; and controlling the engine torque when the current oil temperature is higher than or equal to the predetermined temperature.

22 Claims, 2 Drawing Sheets

METHOD FOR CONTROLLING ENGINE TORQUE OF AUTOMATIC TRANSMISSION FOR VEHICLES AND SYSTEM THEREOF

CROSS-REFERENCE TO RELATED APPLICATION

This application claims priority to and the benefit of Korean Patent Application No. 10-2006-0073008 filed in the Korean Intellectual Property Office on Aug. 2, 2006, the entire contents of which are incorporated herein by reference.

BACKGROUND OF THE INVENTION (a) Field of the Invention

The present invention relates to a method and system of controlling an engine torque of an automatic transmission. More particularly, the present invention calculates a current oil temperature in a torque converter and restricts an engine torque based on the calculated current oil temperature if the torque converter is in a stall state.

(b) Description of the Related Art

An automatic transmission controls a hydraulic pressure by operating at least one solenoid valve according to factors such as vehicle speed and throttle valve opening in order to shift to a target shift speed.

When shifting occurs, an off-going element of the transmission is released from an engaged state and an on-coming element is engaged from a released state. The releasing and engaging are achieved by controlling hydraulic pressure supplied to each element.

When the brake and accelerator pedals are simultaneously depressed when the shift lever is positioned in the D range, the engine speed increases since the accelerator pedal is depressed, but the vehicle does not move since the brake pedal is depressed. The engine generates torque, but the vehicle speed is 0 km/h. This is referred to as a stalled state of the torque converter. In this state, kinetic energy generated by the engine is entirely converted into heat in the torque converter. As a consequence, an oil temperature in the torque converter abruptly rises.

In a conventional automatic transmission, the stalled state of a torque converter is not detected.

When the oil temperature of the torque converter rises above a normal temperature, foam may be generated in the oil and hydraulic pressure applied to a clutch may be low. Therefore, durability of the clutch may degenerate and the vehicle may shift abnormally.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a method and system of controlling engine torque of an automatic transmission that prevent abnormal rise of oil temperature in a torque converter by calculating a current oil temperature and restricting an engine torque based on the calculated current oil temperature when the torque converter is in a stalled state.

A system for controlling an engine torque of an automatic transmission according to an exemplary embodiment of the present invention includes: a vehicle speed detector; an engine speed detector; a brake switch that detects depression of a brake pedal; a throttle opening detector; a position detector that detects a position of a shift lever; an oil temperature detector; and a transmission control unit receiving vehicle information from the detectors and the brake switch. The transmission control unit executes a program for performing each step of a method for controlling the engine torque of the automatic transmission.

A method for controlling engine torque of an automatic transmission according to an exemplary embodiment of the present invention includes: detecting vehicle information; determining whether a stall condition is satisfied; calculating, if the stall condition is satisfied, a current oil temperature in a torque converter; comparing the current oil temperature with a predetermined temperature; and controlling the engine torque if the current oil temperature is greater than or equal to the predetermined temperature.

The method may further include storing the current oil temperature if the current oil temperature is lower than the predetermined temperature.

The calculation of the current oil temperature $T_{cur}$ may include calculating a heat generation amount per second $\Delta Q_{gen}$ in the torque converter, and calculating an oil temperature rise per second $\Delta T$ based on $\Delta Q_{gen}$.

The current oil temperature $T_{cur}$ may be calculated by the equation $T_{Cur}=T_{pre}+(\Delta T)t$, where $T_{pre}$ indicates a previous oil temperature in the torque converter, and t indicates a sampling time.

The heat generation amount per second $\Delta Q_{gen}$ in the torque converter may be calculated by the equation $\Delta Q_{gen}=(\tau_{in})(\omega_e)/J$, where $\tau_{in}$ indicates a torque input to the torque converter, $\omega_e$ indicates a rotational speed of an engine, and J indicates a dimensionless conversion factor.

The oil temperature rise per second $\Delta T$ may be calculated by the equation $\Delta T=\Delta Q_{gen}/((V_{oil})(\rho_{oil})(c_{oil}))$, where $V_{oil}$ indicates a volume of oil, $\rho_{oil}$ indicates density of the oil, and $c_{oil}$ indicates specific heat of the oil.

The vehicle information may include vehicle speed information, rotation speed information of the engine, throttle opening information, position information of a shift lever, and oil temperature information.

The stalled condition may be determined to be satisfied when the vehicle speed is zero, a brake switch determines that the brake pedal is depressed, and the throttle opening is larger than or equal to a predetermined throttle opening.

The predetermined throttle opening may be 40% of a maximum throttle opening.

The control of the engine torque may include determining a limitation amount of the engine torque in accordance with the current oil temperature, and restricting the engine torque so that it does not exceed the limitation amount of the engine torque.

The limitation amount of the engine torque in accordance with the current oil temperature may be stored in a map table.

DETAILED DESCRIPTION OF THE PREFERRED EMBODIMENTS

Exemplary embodiments of the present invention will hereinafter be described in detail with reference to the accompanying drawings.

Figure 1:
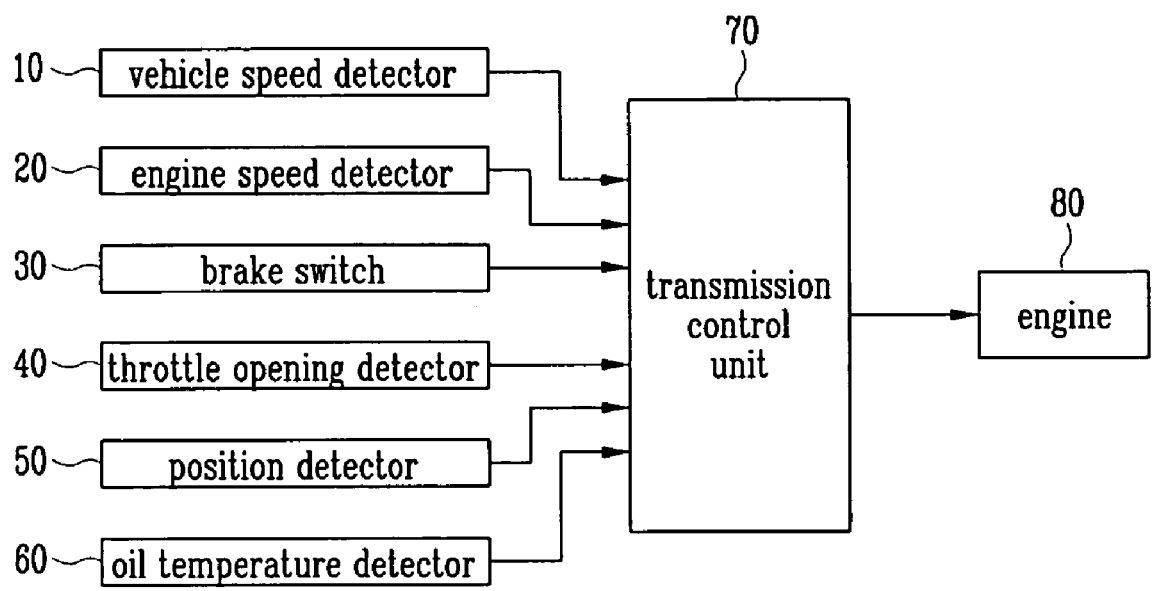
FIG. 1 is a block diagram of a system for controlling an engine torque of an automatic transmission for vehicles according to an exemplary embodiment of the present invention.

As shown in FIG. 1, a system for controlling an engine torque of an automatic transmission for vehicles according to an exemplary embodiment of the present invention includes a vehicle speed detector 10, an engine speed detector 20, a brake switch 30, a throttle opening detector 40, a position detector 50, an oil temperature detector 60, and a transmission control unit 70.

The vehicle speed detector 10 detects a speed of the vehicle and transmits information corresponding thereto to the transmission control unit 70.

The engine speed detector 20 is mounted on an output shaft of the engine 80. The engine speed detector 20 detects a rotation speed of the engine 80 and transmits information corresponding thereto to the transmission control unit 70.

The brake switch 30 is turned on or turned off according to operation of a brake pedal, and transmits information about the operation of the brake pedal to the transmission control unit 70.

The throttle opening detector 40 detects a throttle opening of a throttle valve that opens and closes in accordance with operation of an accelerator pedal, and transmits information corresponding thereto to the transmission control unit 70.

The position detector 50 detects a position of a shift lever and transmits information corresponding thereto to the transmission control unit 70.

The oil temperature detector 60 detects an oil temperature in a torque converter and transmits information corresponding thereto to the transmission control unit 70.

The transmission control unit 70 may include one or more processors activated by a predetermined program, and the predetermined program can be programmed to perform each step of a method for controlling an engine torque of an automatic transmission for vehicles according to an embodiment of this invention. The transmission control unit 70 may also include a memory and associated hardware, software, and/or firmware as may be selected and programmed by a person of ordinary skill in the art based on the teachings herein.

The transmission control unit 70 receives vehicle information from the detectors 10, 20, 40, 50, and 60 and the brake switch 30, and determines whether a stall condition is satisfied.

In addition, the transmission control unit 70 calculates a current oil temperature in the torque converter if the stall condition is satisfied, and controls the engine torque based on the calculated current oil temperature.

Figure 2:
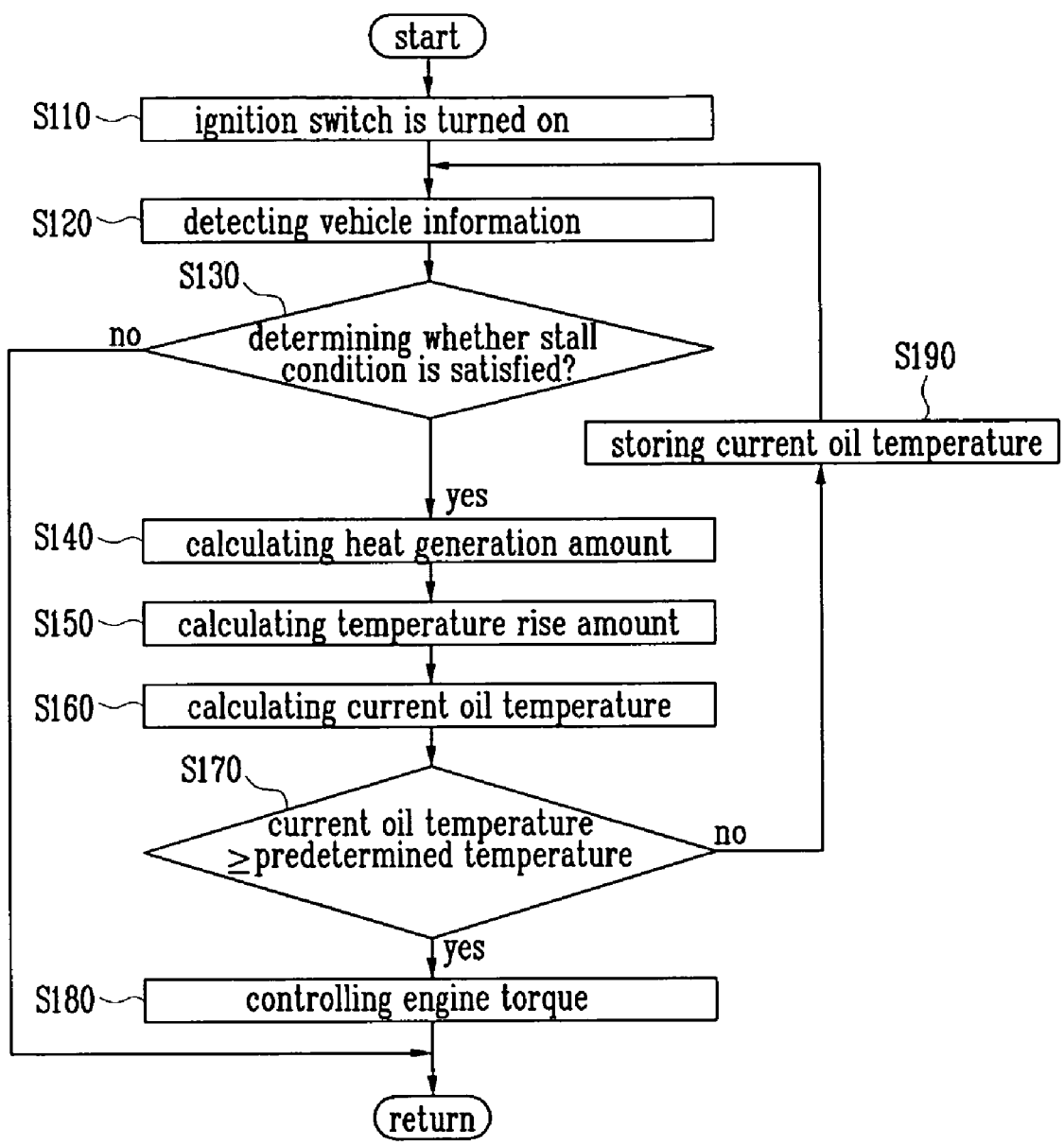
FIG. 2 is a flowchart of a method for controlling an engine torque of an automatic transmission for vehicles according to an exemplary embodiment of the present invention.

As shown in FIG. 2, when an ignition switch is turned on at step S110, the detectors 10, 20, 40, 50, and 60 and the brake switch 30 detect the vehicle information at step S120 and transmit the vehicle information to the transmission control unit 70.

The transmission control unit 70 then determines, based on the detected vehicle information, whether the stall condition of the torque converter is satisfied at step S130.

The stall condition of the torque converter may be deemed to be satisfied when the shift lever is positioned in aDrange, the vehicle speed is 0 km/h, the brake switch 30 determines that the brake pedal is depressed, and the throttle opening is larger than or equal to a predetermined throttle opening.

The predetermined throttle opening may be 40% of a maximum throttle opening.

That is, in a state that the shift lever is positioned in the D range, the brake and accelerator pedals are simultaneously depressed such that the vehicle speed is zero but the engine speed increases.

If the stall condition of the torque converter is not satisfied at step S130, the method for controlling the engine torque according to the exemplary embodiment of the present invention is finished.

If the stall condition of the torque converter is satisfied at step S130, the transmission control unit 70 calculates a heat generation amount per second $\Delta Q_{gen}$ in the torque converter at step S140.

To calculate the heat generation amount per second $\Delta Q_{gen}$ in the torque converter, the transmission control unit 70 first calculates a torque $\tau_{in}$ input to the torque converter. The torque $\tau_{in}$ input to the torque converter is calculated by Equation 1.

$$\tau_{in} = \tau_{eng} - \tau_{loss} \quad \text{[Equation 1]}$$

Here, $\tau_{eng}$ indicates the engine torque, and $\tau_{loss}$ indicates a torque loss by friction. $\tau_{eng}$ may be calculated for each vehicle type based on size, capacity, and type of engine. $\tau_{loss}$ may be determined experimentally for each vehicle type. $\tau_{eng}$ and $\tau_{loss}$ may both be stored in the transmission control unit 70.

After the torque $\tau_{in}$ input to the torque converter is calculated, the heat generation amount per second $\Delta Q_{gen}$ in the torque converter is calculated by Equation 2.

$$\Delta Q_{gen} = (\tau_{in})(\omega_e)/J \quad \text{[Equation 2]}$$

Here, $\omega_e$ indicates the rotation speed of the engine, and J indicates a dimensionless scale factor used to convert the energy on the right-hand side of the equation into the proper units.

After that, the transmission control unit 70 calculates an oil temperature rise per second $\Delta T$ by Equation 3 at step S150.

$$\Delta T = \Delta Q_{gen}/((V_{oil})(\rho_{oil})(c_{oil})) \quad \text{[Equation 3]}$$

Here, $V_{oil}$ indicates volume of the oil, $\rho_{oil}$ indicates density of the oil, and $c_{oil}$ indicates specific heat of the oil. $V_{oil}$, $\rho_{oil}$, and $c_{oil}$ may be predetermined experimental values stored in the transmission control unit 70.

After that, the transmission control unit 70 calculates the current oil temperature $T_{cur}$ by Equation 4 at step S160.

$$T_{cur} = T_{pre} + (\Delta T)t \quad \text{[Equation 4]}$$

Here, $T_{pre}$ indicates a previous oil temperature in the torque converter, and t indicates a sampling time.

The previous oil temperature $T_{pre}$ is the oil temperature of the torque converter stored in the transmission control unit 70 before the current oil temperature $T_{cur}$ is calculated. However, if the oil temperature of the torque converter is not stored in the transmission control unit 70, the previous oil temperature $T_{pre}$ is the oil temperature of the torque converter detected by the oil temperature detector 60.

The current oil temperature $T_{cur}$ in the torque converter is calculated because the oil temperature of the torque converter abruptly rises (about 20° C./sec) and distribution of the oil temperature is not even. Thus, the oil temperature is not precisely detected by the oil temperature detector 60.

The transmission control unit 70 then compares the current oil temperature $T_{cur}$ with a predetermined temperature at step S170. The predetermined temperature may be 100° C., for example, but the present invention is not limited thereto.

If the current oil temperature $T_{cur}$ is lower than the predetermined temperature at the step S170, the current oil temperature $T_{cur}$ is stored in the transmission control unit 70 at step S190.

If the current oil temperature $T_{cur}$ is higher than or equal to the predetermined temperature at the step S170, the transmission control unit 70 controls the engine torque at step S180.

The control of engine torque includes determining a limitation amount of the engine torque based on the current oil temperature and restricting the engine torque so that it does not exceed the limitation amount of the engine torque.

The limitation amount of the engine torque according to the current oil temperature may be stored in a map table in the transmission control unit 70.

For purposes of example only, Table 1 shows one example of the limitation amount of the engine torque based on the current oil temperature.

TABLE 1

|  | Current oil temperature (° C.) | | | |
| --- | --- | --- | --- | --- |
|  | 100 | 110 | 120 | 130 |
| Limitation amount of Engine torque (%) | 70 | 60 | 50 | 40 |

The restriction of the engine torque may include controlling ignition timing and fuel injection amount.

As described above, according to the present invention, oil temperature may be stabilized by restricting engine torque based on the calculated current oil temperature in a torque converter of an automatic transmission when the torque converter is in a stall state.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of controlling an engine torque of an automatic transmission, comprising:
    detecting vehicle information;
    determining, based on the vehicle information, whether a stall condition is satisfied;
    if the stall condition is satisfied, calculating a current oil temperature in a torque converter;
    comparing the current oil temperature to a predetermined temperature; and
    controlling the engine torque if the current oil temperature is greater than or equal to the predetermined temperature.

2. The method of claim 1, further comprising storing the current oil temperature if the current oil temperature is lower than the predetermined temperature.

3. The method of claim 1, wherein the calculating the current oil temperature $T_{cur}$ comprises:
    calculating a rate of heat generation $\Delta Q_{gen}$ in the torque converter; and
    calculating a rate of change of oil temperature $\Delta T$ based on $\Delta Q_{gen}$.

4. The method of claim 3, wherein the calculating the current oil temperature $T_{cur}$ comprises an equation $T_{cur}=T_{pre}+(\Delta T)t$,
where $T_{pre}$ indicates a previous oil temperature in the torque converter, and t indicates a sampling time.

5. The method of claim 3, wherein the calculating the rate of heat generation $\Delta Q_{gen}$ in the torque converter comprises an equation $\Delta Q_{gen}=(\tau_{in})(\omega_e)/J$,
where $\tau_{in}$ indicates a torque input to the torque converter, $\omega_e$ indicates a rotational speed of an engine, and J indicates a dimensionless scale factor.

6. The method of claim 3, wherein the calculating the rate of change of oil temperature $\Delta T$ comprises an equation $\Delta T=\Delta Q_{gen}/((V_{oil})(\rho_{oil})(c_{oil}))$,
where $V_{oil}$ indicates a volume of oil, $\rho_{oil}$ indicates a density of the oil, and $c_{oil}$ indicates a specific heat of the oil.

7. The method of claim 1, wherein the vehicle information comprises vehicle speed information, rotation speed information of the engine, throttle opening information, position information of a shift lever, and oil temperature information.

8. The method of claim 1, wherein the stall condition is determined to be satisfied if the vehicle speed is zero, a brake pedal is determined to be depressed, and the throttle opening is larger than or equal to a predetermined throttle opening.

9. The method of claim 8, wherein the predetermined throttle opening is about 40% of a maximum throttle opening.

10. The method of claim 1, wherein the controlling the engine torque comprises:
    determining a limitation amount of the engine torque based on the current oil temperature; and
    restricting the engine torque not to exceed the limitation amount of the engine torque.

11. The method of claim 10, wherein the limitation amount of the engine torque is stored in a map table.

12. A system for controlling an engine torque of an automatic transmission, comprising:
    a vehicle speed detector for detecting a vehicle speed;
    an engine speed detector for detecting a rotation speed of an engine;
    a brake switch for detecting a depression of a brake pedal;
    a throttle opening detector for detecting a throttle opening;
    a position detector for detecting a position of a shift lever;
    an oil temperature detector for detecting an oil temperature; and
    a transmission control unit for receiving vehicle information from the detectors and from the brake switch, and for executing a program, the program comprising instructions for:
        determining whether a stall condition is satisfied based on the vehicle information,
        if the stall condition is determined to be satisfied, calculating a current oil temperature in a torque converter,
        comparing the current oil temperature to a predetermined temperature, and
        controlling the engine torque if the current oil temperature is higher than or equal to the predetermined temperature.

13. The system of claim 12, further comprising storing the current oil temperature if the current oil temperature is lower than the predetermined temperature.

14. The system of claim 12, wherein the calculating the current oil temperature $T_{cur}$ comprises:
    calculating a rate of heat generation $\Delta Q_{gen}$ in the torque converter; and
    calculating a rate of change of oil temperature $\Delta T$ based on $\Delta Q_{gen}$.

15. The system of claim 14, wherein the calculating the current oil temperature $T_{cur}$ comprises an equation $T_{cur}=T_{pre}+(\Delta T)t$, where $T_{pre}$ indicates a previous oil temperature in the torque converter, and t indicates a sampling time.

16. The system of claim 14, wherein the calculating the rate of heat generation $\Delta Q_{gen}$ in the torque converter comprises an equation $\Delta Q_{gen} = (\tau_{in})(\omega_e)/J$,
where $\tau_{in}$ indicates a torque input to the torque converter, $\omega_e$ indicates a rotational speed of an engine, and J indicates a dimensionless scale factor.

17. The system of claim 14, wherein the calculating the rate of change of oil temperature $\Delta T$ comprises an equation $\Delta T = \Delta Q_{gen}/((V_{oil})(\rho_{oil})(c_{oil}))$,
where $V_{oil}$ indicates a volume of oil, $\rho_{oil}$ indicates a density of the oil, and $c_{oil}$ indicates a specific heat of the oil.

18. The system of claim 12, wherein the vehicle information comprises vehicle speed information, rotation speed information of the engine, throttle opening information, position information of a shift lever, and oil temperature information.

19. The system of claim 12, wherein the stall condition is determined to be satisfied if the vehicle speed is zero, a brake pedal is determined to be depressed, and the throttle opening is larger than or equal to a predetermined throttle opening.

20. The system of claim 19, wherein the predetermined throttle opening is about 40% of a maximum throttle opening.

21. The system of claim 12, wherein the controlling the engine torque comprises:
determining a limitation amount of the engine torque based on the current oil temperature; and
restricting the engine torque not to exceed the limitation amount of the engine torque.

22. The system of claim 21, wherein the limitation amount of the engine torque is stored in a map table.

* * * * *